April 29, 1947.  L. F. JORDAN  2,419,780
CONVERTIBLE AIRPLANE ADAPTED FOR HORIZONTAL,
VERTICAL, AND HOVERING FLIGHT
Filed Jan. 3, 1946  2 Sheets-Sheet 1
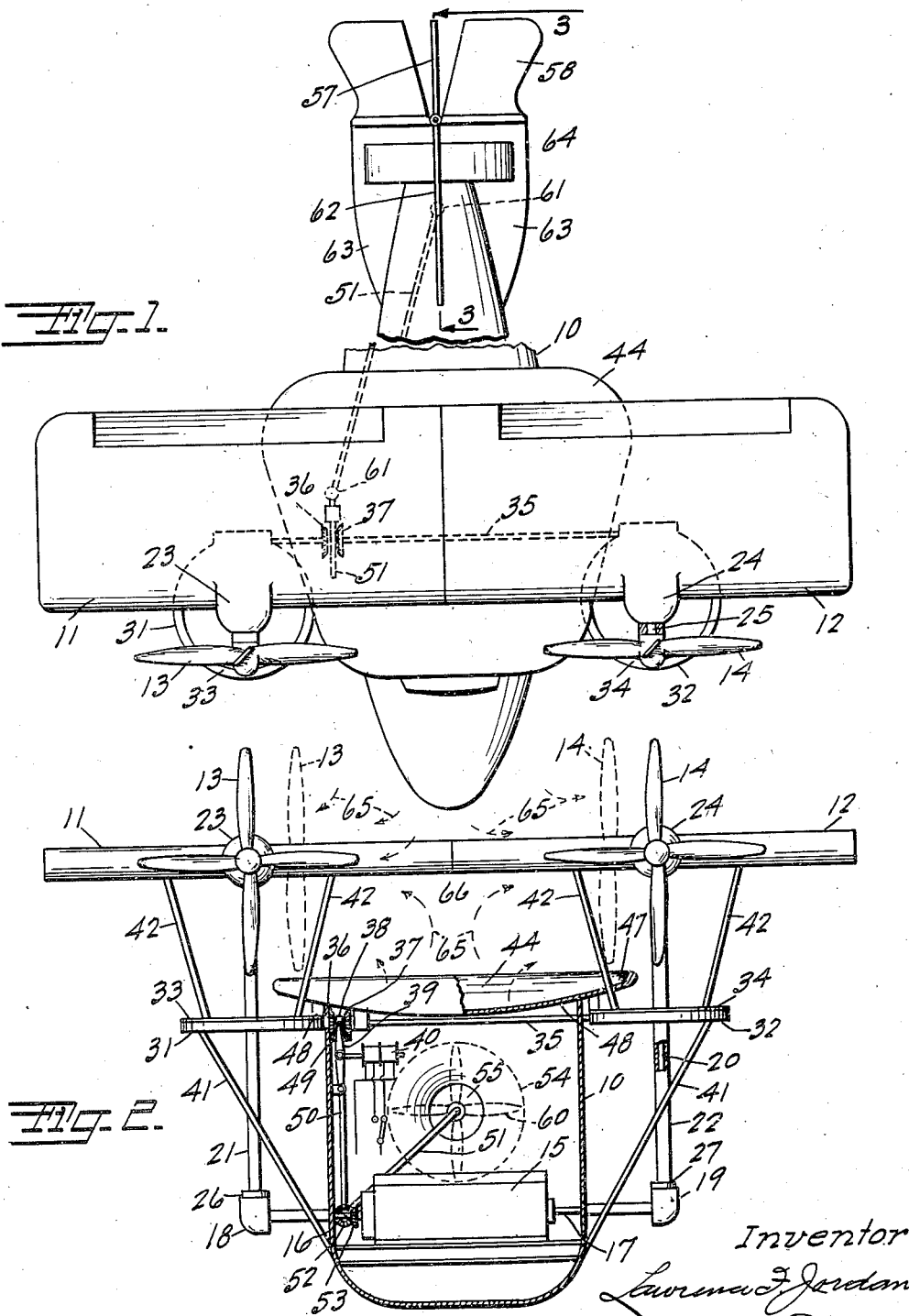

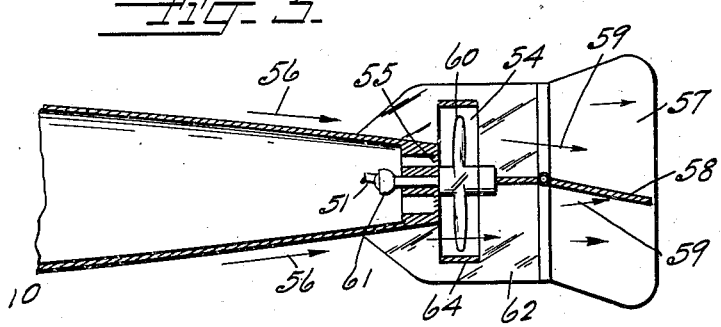
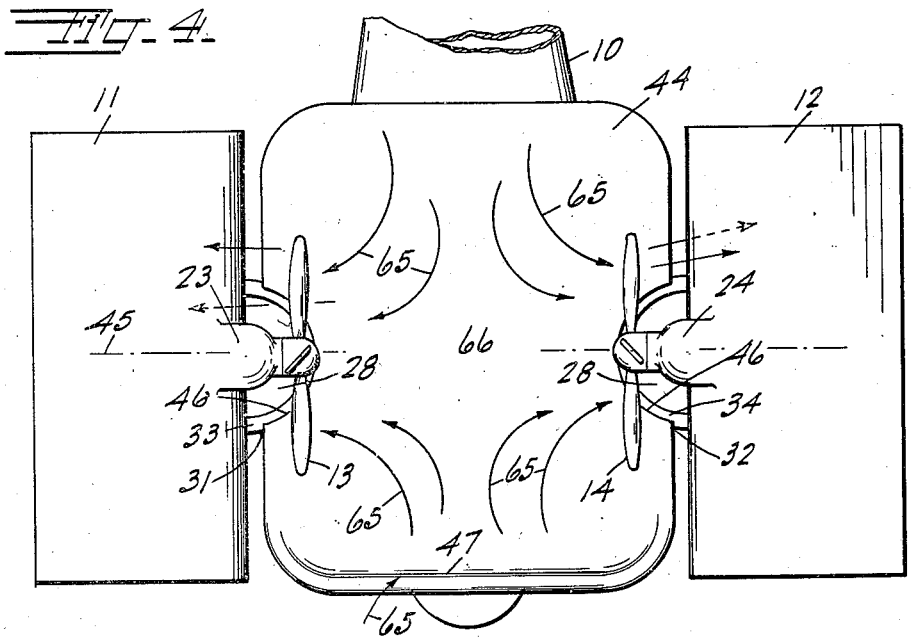
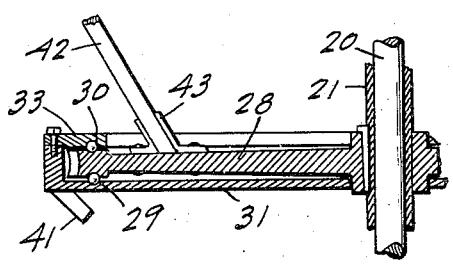

Patented Apr. 29, 1947

2,419,780

UNITED STATES PATENT OFFICE 2,419,780

CONVERTIBLE AIRPLANE ADAPTED FOR HORIZONTAL, VERTICAL, AND HOVERING FLIGHT

Lawrence F. Jordan, Oakland, Calif.

Application January 3, 1946, Serial No. 638,832

5 Claims. (Cl. 244—12)

This invention is an improvement over known types of helicopters to which class it does not belong because the propellers always operate in vertical planes or on horizontal axes. It incorporates an entirely new principle of lift and is so designed that any desired relation between lift and flight can be obtained at will. It can be made to hover over any specific area, to rise or lower vertically or at any desired angle and therefore can be brought to land or be taken off from areas which are inaccessible to any other type of aeroplane or to any type of helicopter.

So far as I am aware, all heavier-than-air types of aircraft, if equipped with propellers which operate solely in a vertical plane, must gain a certain land speed before the wings can effect any lifting action, while helicopters and the like depend on propellers which operate in a horizontal plane to create the lift without requiring land speed. Also, aeroplanes which have been proposed for straight lift operate for lift on the helicopter principle in that either the motor or the wings are so rotated or swung about an axis as to place the propellers in a horizontal plane to convert the driving force of the propellers to a lifting force.

All of the foregoing principles are foreign to my new principle in which my plane can rise or lower vertically or angularly from a given point without any land run or developed speed, and can take off in the same manner as a conventional plane after attaining a predetermined land speed or land in the same way, can stop anywhere in its flight and hover, turn in any direction, and rose or lower at will.

Therefore this plane is ideally suited for aerial surveys, for aerial photography for which the plane can be brought to the most suitable elevation to bring the desired area within the field of the camera to produce as large an image as possible, and to take off and land in very restricted areas and in areas which are inaccessible to other types of aeroplanes and helicopters.

This new principle involves a new type of wing which may be termed a vacuum or lift wing which is auxiliary to the regular airfoil wings, with the airfoil wings and vacuum wing being in use at all times and cooperative and gradually being changeable at will from a flying function to an elevating or lowering function and with any desired relation between the two functions.

The objects and advantages of the invention are as follows:

First, to provide a universal maneuverable aeroplane.

Second, to provide an aeroplane which is controllable for elevating or lowering, and flight, in any relative desired ratio at will so that the aeroplane can take off and land in the same manner as a conventional flight plane or maneuver at will similar to a helicopter.

Third, to provide a plane having conventional airfoil wings with a lift or vacuum wing so that the plane can be raised or lowered vertically or at any relative angle at will.

Fourth, to provide an aeroplane with airfoil wings adjustable about a vertical axis and with conventional propellers and driving means therefor, and with an auxiliary fixed wing ordinarily functioning as a flight wing and upon adjustment of the airfoil wings functioning in direct ratio with the degree of adjustment from an auxiliary airfoil wing to a vacuum or lift wing.

Fifth, to provide an aeroplane with a median vacuum wing, and with airfoil wings located at a higher level and each having a propeller and driving means therefor, and with the airfoil wings coincidently adjustable about a vertical axis for adjustment of the propellers in opposition over the vacuum wing to produce an intense vacuum for lifting the plane through the medium of the vacuum wing, and with the airfoil wings coincidently functioning as lifting wings.

Sixth, to provide an aeroplane with conventional airfoil wings and propellers, and with a vacuum wing cooperative with the airfoil wings in direct flight and with the airfoil wings adjustable at will for cooperation with the vacuum wing with the propellers operating in opposition to create an intense vacuum over the vacuum wing and an air stream over the airfoil wings, for lift, at will.

In describing the invention reference will be made to the accompanying drawings, in which:

Fig. 1 is a top plan view of the invention with the airfoil wings adjusted for direct forward flight.

Fig. 2 is a front elevation of Fig. 1 with the fuselage in section to show motor and operating connections, and also indicates in dotted lines the relative position of the propellers when the airfoil wings are adjusted for lift only.

Fig. 3 is a fragmentary view taken on line 3—3 of Fig. 1 showing the auxiliary flight and control propeller.

Fig. 4 is a top plan view of the airfoil wings and propellers adjusted for cooperation with the vacuum wing for lift and showing a modification in the form of the vacuum wing.

Fig. 5 fragmentarily illustrates the adjustment and mounting or support for the airfoil wings.

The invention includes conventional airfoil wings each having a propeller and each adjustable about a vertical axis for adjustment for direct flight or in opposition, or to any degree therebetween, at will; a vacuum wing to be acted upon by the propellers when the latter are in partial or total opposition to produce a more or less intense vacuum over the vacuum wing for lift or any relative combination of airfoil lift and vacuum lift; and a combined propulsion and control propeller mounted on the tail structure.

The fuselage 10 is formed to a conventional slipstream design and therefore in principal aspects and appearance does not vary from the conventional aeroplane structure.

The wings 11 and 12 are of conventional form but of lesser length and greater width, though the length relative to the cross-sectional area of the largest portion of the fuselage is somewhat greater than illustrated, this distortion of relative sizes being necessary to clearly show the relatively small operative connections.

Unlike a conventional aeroplane, the wings are pivoted on a vertical axis so that they may be adjusted in opposition at will, though some aeroplanes have wings which are adjustable on a vertical axis, not to place them in opposition, but to fold the wings back for compactness when not in use, as for storage.

Each wing has a propeller 13 and 14 projecting from the leading edge of the wing and centrally located, and though not shown, there may be more than one propeller for each wing if they are equally spaced from the longitudinal center of the wing for balance, and there is nothing to bar the installation of additional fixed airfoil wings; such modifications being fully anticipated.

The propellers are preferably driven by a single motor 15 so that the propellers can be relied upon to operate in perfect synchronism, and this is accomplished through crank-shaft extensions 16 and 17 from the engine operating through the gear boxes 18 and 19 and thence through the vertical shafts 20 in sleeves 21 and 22 and thence through gear boxes 23 and 24 for driving the propeller shafts 25 on which the propellers 13 and 14 are mounted, each gear box including a suitable power-transmitting couple such as bevel, miter or spiral gears.

The sleeves 21 and 22 are rotatable in step bearings 26 and 27 and have each secured intermediate their height a worm gear 28 which is suitably supported peripherally as by ball bearings 29 and 30 which operate in suitable raceways formed in the opposite faces of the rim of the gear and in the worm-gear housings 31 and 32 and their top bearing plates 33 and 34, and the two worm gears are simultaneously driven in opposite directions by worms driven by the shaft 35.

Reversing means such as a pair of bevel gears 36 and 37 which are freely rotatable on the shaft 35, and an interposed engaging member such as a jaw, magnetic, or friction clutch element 38 which is slidable on and keyed to the shaft, together with operating means such as a lever 39 which may be hand operated or operated through solenoids 40 is provided for control of the airfoil wings.

Suitable struts or braces 41 are provided for the worm-gear housings and other suitable struts 42 support the airfoil wings and are secured at their lower ends relatively close to the peripheries of the worm gears as indicated at 43 in Fig. 5. Thus the airfoil wings depend for their support, stability and rigidity on the worm gears and for which reason the worm gears are so well supported about the periphery as indicated in Fig. 5.

The vacuum wing 44 is mounted on top of the fuselage and its shape is made to suit the specific conditions of static balance of the plane and to clear any obstructional devices, that illustrated in Fig. 1 being suitable for a plane in which the center of gravity fell back of the axial center 45 of the opposed propellers to balance the lift on opposite ends of the plane, while that in Fig. 4 is most suitable for planes in which the center of gravity falls on the axis of the opposed propellers, while for planes in which the center of gravity falls ahead of the axis 45, the vacuum wing in Fig. 1 would be reversed, end for end.

As illustrated in Fig. 1 the vacuum wing readily clears all struts 42, while in Fig. 3 the vacuum wing is relieved at 46 to clear these struts.

This vacuum wing is somewhat saucer-shaped, but with the sides and front edges preferably rather sharply recessed as indicated at 47 but with the bottom surface uniformly sloped and curved. The vacuum wing is set just low enough to clear the tips of the propeller blades, and the inner edges of the worm gear housings are attached to the vacuum wing for support as indicated at 48 thus assuring rigid support for the worm gears.

The clutch gears 36 and 37 are selectively driven by a bevel pinion 49 which is mounted on a shaft 50 which in turn is driven through a suitable operative connection from the rear-propeller drive shaft 51 which is operatively coupled to the engine crank shaft extension 16 through bevel gears 52 and 53.

The tail structure is similar in all respects to that of the conventional aeroplane with the exception that a wind tunnel 54 is mounted within the stabilizer structure, this wind tunnel being closed as indicated at 55 to the interior of the fuselage but opening to the slip stream 56 along the tail and discharging directly to the rudder 57 and elevators 58 as indicated by the flow arrows 59, and a propeller 60 is located within this wind tunnel and may be separately driven but preferably driven by the same motor 15 through the shaft 51 which is coupled through universal joints 61, the vertical horizontal stabilizer fins 62 and 63 functioning simultaneously as supports and reinforcements for the wind tunnel housing 64.

For operation as a conventional aeroplane, for takeoff and landing from and to a landing strip, the invention appears as illustrated in Figs. 1 and 2, the operation and control of the plane being identical to that of any standard aeroplane, and requiring a definite land speed for take-off and for landing. In this case the vacuum wing functions as an auxiliary airfoil wing while simultaneously introducing some additional lift from both, speed and wash of the propellers.

For use as a lifting plane; to rise or lower vertically from a given point similar to that accomplished with a helicopter, the winds are adjusted to the position illustrated in Fig. 4 with the propellers opposed and operating over the vacuum wing. The propellers both draw the air from the front and back and over the top of the vacuum wing as indicated at 65 creating an intense vacuum over the wing as indicated at 66 causing the plane to lift vertically. At the same time the stream from the propeller acts on the airfoil wings which also are in opposition and adding their inherent lift to that of the vacuum wing, and at the same time the propeller 60 in the tail provides sufficient current to make the control mechanism effective and will tend to propel the plane and which, if not desired, can be overcome by turning the airfoil wings a little farther rearward than that shown in Fig. 4 which will overcome the urgence of the control propeller so that the plane can be made to rise vertically, or even be made to back up if it should be in a place where backing is necessary to clear.

After the plane has reached the desired altitude it can be made to hover by decreasing the R. P. M. of the propellers and can be made to lower by further decreasing the R. P. M.

If after attaining a predetermined altitude the plane is to be started off on a direct flight, it can first be turned into the direction of flight through the medium of the controls, and following orientation, the clutch can be reversed so that with the propellers operating at an increased speed the airfoil wings will slowly turn back to the flying position illustrated in Fig. 1, gradually picking up speed and transferring support from the vacuum wing to the airfoil wings.

It will be noted that the slow adjustment of the airfoil wings is absolutely essential and which is the reason for using a single thread worm and worm gear for the adjustment, since, while the plane is being supported by the vacuum wing it may remain stationary, therefore considering the plane stationary in the air and the adjustment for the airfoil wings set in motion; initial movement of the wings slightly starts movement of the plane without noticeable decrease in the vacuum lift, and as the wings slowly move about the speed of flight rapidly increases without completely eliminating the vacuum lift until the plane has attained sufficient air speed for support by the airfoil wings and their auxiliary vacuum wing, the control propeller simultaneously driving the plane to gain suitable air speed. Obviously, when the plane is in full flight, slow adjustment of the wings is not so essential but still important for suitable control of the plane.

I claim:

1. An aeroplane comprising; a pair of airfoil wings each having a propeller and being adjustable about vertical axes to bring the leading edges of the respective airfoil wings and their propellers facing each other, and means for adjusting said airfoil wings from forwardly facing to inwardly facing position; a vacuum wing located in a plane below said airfoil wings at a distance to clear said propellers and located in gradually increasing cooperative relation as the propellers are adjusted from their forward flight position to the position facing each other to block movement of air to the propellers from below and develop a more or less intense vacuum over the vacuum wing and between the propellers in conformity with the speed of the propellers, to lift or lower the aeroplane at will.

2. An aeroplane comprising; a pair of airfoil wings mounted for rotation on vertical axes, and each having a propeller operating in a vertical plane, and means for adjusting said wings at will from a position in which the leading edges of the wings and the propellers are directed forwardly for forward flight, to one in which the leading edges and the propellers face each other for lifting and lowering, and driving means for said propellers; and a vacuum wing located in a plane below said airfoil wings and at a distance to clear said propellers and between the axes of the wings to block drift of all air from below the propellers with the propellers thereby creating a more or less intense vacuum above the vacuum wing in conformity with the speed of rotation of the propellers for lifting or lowering the plane.

3. A structure as defined in claim 1; said means for adjusting said wings including a worm gear for each wing and rotatable on a vertical axis, and driving means for slowly rotating said worm gears in unison and means for reversing said driving means, to provide for a gradual change from vacuum support of the plane to flight support by gradually increasing the forward speed of the plane while maintaining vacuum support until the speed of the plane is sufficient for independent support by the airfoil wings.

4. A structure as defined in claim 1; said means for adjusting said wings including a worm gear for each wing and means for slowly driving said worm gears and including reversing means; and support means for said worm gears and support means between each wing and its worm gear and forming the sole support for the wing.

5. A structure as defined in claim 1; said means for adjusting said wings including a worm gear for each wing and rotatable on a vertical axis, and driving means for slowly rotating said worm gears in unison and means for reversing said driving means, to provide for a gradual change from vacuum support of the plane to flight support by gradually increasing the forward speed of the plane while maintaining vacuum support until the speed of the plane is sufficient for independent support by the airfoil wings; supporting elements between each worm gear and its cooperative airfoil wing with said worm gears forming the sole supports for said airfoil wings.

LAWRENCE F. JORDAN.

REFERENCES CITED

The following references are of record in the file of this patent:

UNITED STATES PATENTS

| Number | Name | Date |
| --- | --- | --- |
| 1,824,250 | Wells | Sept. 22, 1931 |
| 1,980,869 | Matlock | Nov. 13, 1934 |

FOREIGN PATENTS

| Number | Country | Date |
| --- | --- | --- |
| 510,441 | French | Sept. 4, 1920 |